United States Patent
Ziller

(10) Patent No.: US 10,217,300 B2
(45) Date of Patent: Feb. 26, 2019

(54) METHOD FOR PERFORMING AUTOMATIC OPENING OF A VEHICLE OR A PAYMENT PROCESS, AND ASSOCIATED APPARATUS

(71) Applicant: SIEMENS AKTIENGESELLSCHAFT, Munich (DE)

(72) Inventor: Andreas Ziller, Oberhaching (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 21 days.

(21) Appl. No.: 14/893,156

(22) PCT Filed: May 19, 2014

(86) PCT No.: PCT/EP2014/060218
§ 371 (c)(1),
(2) Date: Nov. 23, 2015

(87) PCT Pub. No.: WO2014/187767
PCT Pub. Date: Nov. 27, 2014

(65) Prior Publication Data
US 2016/0125675 A1    May 5, 2016

(30) Foreign Application Priority Data

May 23, 2013  (DE) .................. 10 2013 209 612

(51) Int. Cl.
*G07C 9/00*    (2006.01)
*B60R 25/24*   (2013.01)

(52) U.S. Cl.
CPC .......... *G07C 9/00007* (2013.01); *B60R 25/24* (2013.01); *G07C 9/00309* (2013.01);
(Continued)

(58) Field of Classification Search
CPC .................................. G07C 5/008; G01C 7/04
(Continued)

(56) References Cited

U.S. PATENT DOCUMENTS 6,476,732 B1 * 11/2002 Stephan ................. G01C 21/26
340/545.1
6,670,883 B1 * 12/2003 Asakura ................. B60R 25/24
307/10.1
(Continued)

FOREIGN PATENT DOCUMENTS

CN    103021051 A    4/2013    ............. G07C 9/00
DE    44 41 988 A1   5/1996
(Continued)

OTHER PUBLICATIONS

Naone E.; "Autoklau per antenne"; Technology Review; Jan. 10, 2011; www.heise.de/tr/artikel/Autoklau-per-Antenne-1165992.html; 3 pages.
(Continued)

*Primary Examiner* — Vernal U Brown
(74) *Attorney, Agent, or Firm* — Slayden Grubert Beard PLLC

(57) ABSTRACT

Receiving a first signal or a first message and taking the receipt of the first signal or of the first message as a basis for producing a second signal or a second message for a driver of a vehicle.

20 Claims, 4 Drawing Sheets

(52) U.S. Cl.
CPC .............. *G07C 2009/00325* (2013.01); *G07C 2009/00555* (2013.01); *G07C 2009/00769* (2013.01)

(58) Field of Classification Search
USPC ......................................................... 340/5.2
See application file for complete search history.

(56) References Cited

U.S. PATENT DOCUMENTS

| | | | | |
|---|---|---|---|---|
| 2004/0066092 | A1* | 4/2004 | Muller | .................... B60R 25/24 307/10.1 |
| 2012/0130604 | A1* | 5/2012 | Kirshon | .............. F02N 11/0822 701/51 |

FOREIGN PATENT DOCUMENTS

| | | |
|---|---|---|
| DE | 102 33 597 A1 | 2/2004 |
| DE | 103 39 293 A1 | 3/2005 |
| DE | 10 2004 001 904 A1 | 8/2005 |
| DE | 10 2013 209 612.7 | 5/2013 |
| EP | 2 528 045 A1 | 11/2012 |
| EP | 2 584 514 A1 | 4/2013 |
| FR | 2 888 364 A1 | 1/2007 |
| WO | 2012/017214 A1 | 2/2012 |
| WO | PCT/EP2014/060218 | 5/2014 |

OTHER PUBLICATIONS

Francillon A. et al.; "Relay attacks on passive keyless entry and start systems in modern cars"; Network and Distributed System Security Symposium (NDDS); 2011; eprint.iacr.org/2010/332.pdf; 15 pages.
Search Report dated Mar. 6, 2014 in related German Application No. 10 2013 209 612.7, 5 pages.
International Search Report dated Sep. 11, 2014 in related International Application No. PCT/EP2014/060218, 3 pages.
Chinese Office Action, Application No. 201480037290.5, 15 pages, dated Nov. 2, 2016.

* cited by examiner

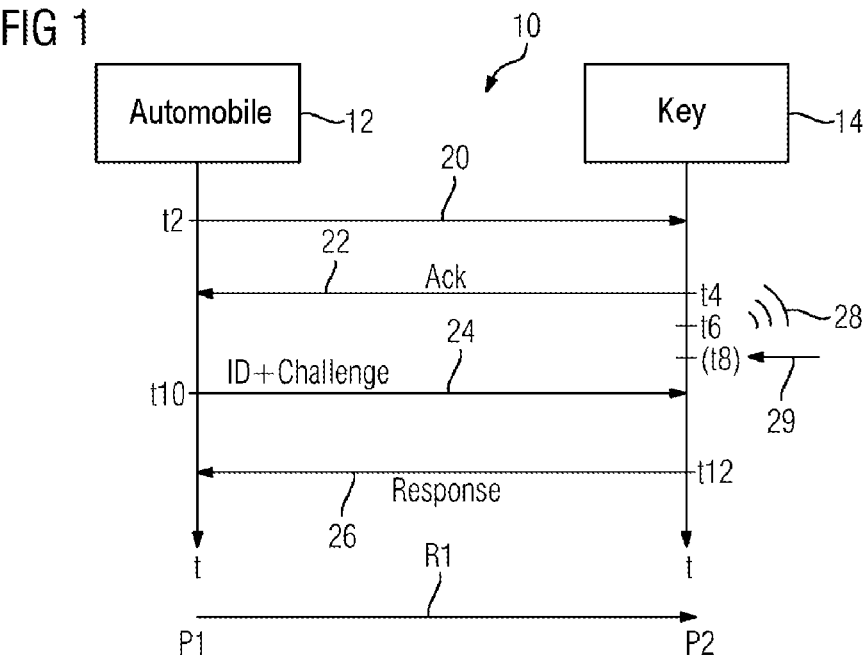
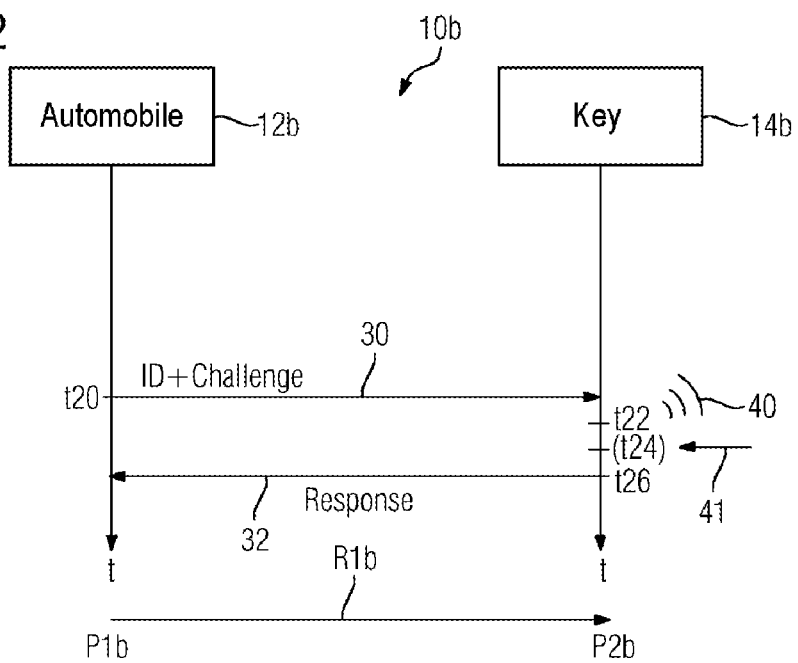

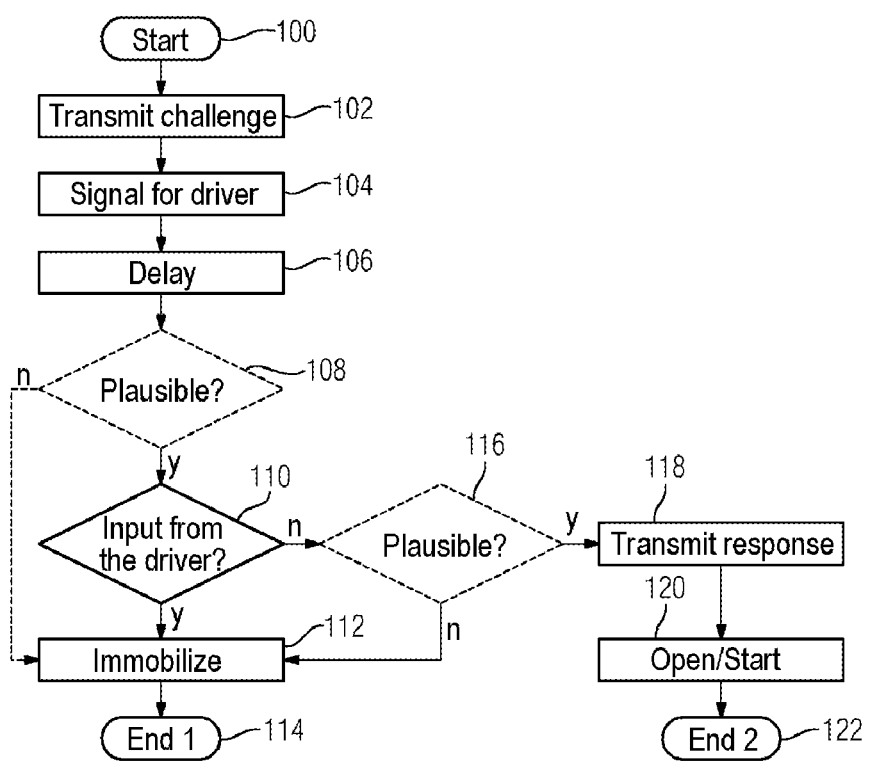

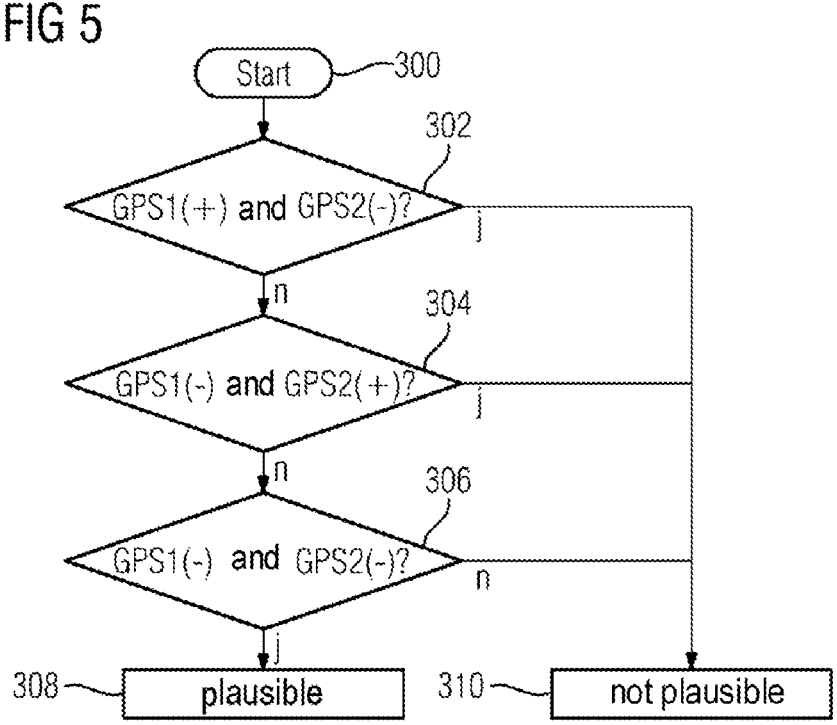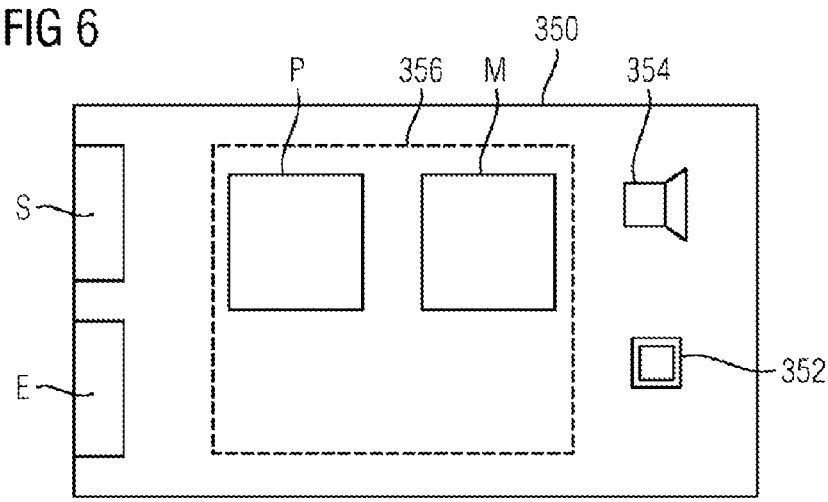

METHOD FOR PERFORMING AUTOMATIC OPENING OF A VEHICLE OR A PAYMENT PROCESS, AND ASSOCIATED APPARATUS

CROSS-REFERENCE TO RELATED APPLICATIONS

This application is the U.S. national stage of International Application No. PCT/EP2014/060218, filed May 19, 2014 and claims the benefit thereof. The International Application claims the benefit of German Application No. 10 2013 209 612.7 filed on May 23, 2013, both applications are incorporated by reference herein in their entirety.

BACKGROUND

One aspect of the invention relates inter alia to a method for performing automatic opening of a vehicle and/or enabling of the starting facility of a vehicle, e.g. enabling of a start button in the vehicle. Such systems are known as keyless entry systems and are prevalent. An electronic key can be used that, by way of example, no longer has a key bit with cutouts that are geared to tumblers in a door lock, known as "keyless entry". Alternatively, a mechanical key may be available as a reserve.

Similar technologies are also used for contactless electronic payment, in which, in contrast to credit card payments or EC card payments, no electrically conductive contact takes place between a checkout and a payment apparatus of the purchaser. By way of example, it is thus possible to use NFC (Near Field Communication) for payment. NFC can also be used in connection with an entry system, particularly for an automobile.

Both the keyless entry system and the payment system, particularly in the case of an inexpensive and hence simple version, are secure against misuse only to a particular extent. In particular, these systems can be attacked by virtue of the control apparatus of the driver or of the customer being exposed to signals as arise close to the automobile or the checkout. However, these signals are transmitted by way of misuse over a relatively great distance from the automobile or from the checkout. The control apparatus then erroneously assumes proximity to the automobile or to a checkout.

DE 103 39 293 A1 discloses a method for operating the closing system of a motor vehicle. DE 10 2004 001 904 A1 discloses a closing system. DE 44 41 988 A1 discloses a remote control. EP 2 528 045 A1 discloses a method for cardless authentication. EP 2 584 514 A1 discloses a method for credit card transactions on the Internet (cloud). WO 2012/017214 A1 discloses a vehicle security apparatus. DE 102 33 597 A1 discloses optoacoustic signal generation from the electronic identity card or transponder as a method for warning of illegal attempts to enter keyless operating entry systems. EP 2 888 364 discloses a system and carrier for security authentication.

SUMMARY

One aspect of the invention relates to a method for performing automatic opening and/or enabling of the starting facility of a vehicle, including:
  reception of a first signal or a first message that is used to perform automatic opening and/or enabling of a vehicle, and
  on the basis of the reception of the first signal or the first message, production of a second signal or a second message for the driver of the vehicle.

One aspect of the invention additionally relates to a method for performing an automatic contactless entry process or contactless payment process,
  wherein either the occurrence or absence of a termination signal or a termination message on a mobile apparatus is taken as a basis for performing the process when a termination signal or a termination message is not produced within a prescribed time after the production of a signal or a message for a person involved in the process, and wherein the process is not carried out when the person produces the termination signal or the termination message within a prescribed time.

Furthermore, one aspect of the invention relates to an apparatus for performing automatic opening and/or enabling of the starting facility of a vehicle, including:
  a reception unit for receiving a first signal or a first message that is used to perform automatic opening and/or enabling of a vehicle,—a transmission unit that takes the reception of the first signal or the first message as a basis for sending a second signal or a second message for the driver of the vehicle.

Simple methods for performing automatic processes are specified that, in particular, provide better protection against misuse and/or do not or only insubstantially lower user convenience. Furthermore, an associated apparatus is intended to be specified.

A method for performing automatic opening and/or enabling of the starting facility of a vehicle can contain:
  reception of a first signal or a first message that is used to perform automatic opening and/or enabling of a vehicle, and
  on the basis of the reception of the first signal or the first message, production of a second signal or a second message for the driver of the vehicle.

Hence, the driver can be made aware of processes for opening and/or starting his vehicle at all times or in unusual situations. This also applies to the case in which an unauthorized person wishes to gain entry to the vehicle. Active intervention by the driver for opening is not required, however, which means that user convenience is retained, i.e. the vehicle continues to open on the approach of the driver, who is carrying an electronic key but does not have to use it.

The second signal provides the driver with additional security. The extent of additional attention for the second signal can be reduced if the second signal is produced only on the basis of an unsuccessful plausibility check on the circumstances for opening and/or starting, for example. If everything is plausible, it is possible for the second signal not to be produced. However, precautions are taken for the case of a negative plausibility check insofar as the second signal or the second message is then produced.

The driver can be provided with an option to terminate the opening or the enabling. However, a simple variant of the method can also operate without such an option, i.e. the driver is only made aware by the second signal or the second message.

The term signal gives greater emphasis to the analog character of a transmission. By contrast, message gives greater emphasis to the digital character of a transmission.

Over the course of the method, it is possible to check whether, within a prescribed time, a termination signal or a termination message is received that indicates that the opening and/or the enabling is meant to be terminated. Alternatively, it is possible to check whether, within the prescribed time, no such termination signal or no such termination message has been received. In addition, either the opening and/or the enabling of the starting facility can be performed when the termination signal or the termination message has not been received. On the other hand, the opening and/or the enabling of the starting facility can be not performed when the termination signal or the termination message has been received.

By way of example, the door of the vehicle can be opened in combination with grasping of the handle. The starting facility of the vehicle is enabled by activating a start button in the vehicle, for example, which can be used to start the motor only in the activated state.

The second signal or the second message can be produced for a person who should usually be involved in the process.

By way of example, the termination signal may be a button push on a button on that apparatus that performs the method or on an apparatus to which the second message has been transmitted. Alternatively or additionally, other user inputs can prompt the termination signal.

A check can be performed only for one of the two indicated conditions. The other option is available if the checked condition does not arise.

The process can be not performed as a result of the sending of a third message being terminated and/or blocked and/or not performed, for example.

In this case, "either" can mean that only one indicated possibility applies in a given case but, in a different situation, the other possibility can also arise, which means that appropriate precautions need to be taken.

The technical effect of the method can be considered to be that the involvement of or demands on a person is/are reduced to a minimum, which is advantageous particularly in the case of technical apparatuses that are used for this very purpose, e.g. opening a vehicle without the insertion of a key into a door lock and/or starting a vehicle without the insertion of a key into an ignition lock.

The driver continues to be informed about processes on or in his vehicle at all times or in critical situations on account of the second signal or the second message. In particular, the driver is informed when others wish to gain entry to the vehicle without authorization, e.g. by what is known as a relay (or forwarding) method.

Even if the driver misses the opportunity for termination, he is at least prewarned and can immediately go to his vehicle or take another measure, for example.

The prescribed time may be in the range from 1 second to 10 seconds, preferably in the range from 1 to 2 seconds or in the range from 1 to 3 seconds. The first signal or the first message can contain a datum for which the receiver of the first signal or the first message is meant to produce a response datum, particularly as part of a challenge/response method for establishing the identity of the receiver of the first signal or the first message.

Even if a time of, by way of example, less than 3 seconds is too short to react immediately in a given case, the driver can still take other measures. Secondly, a short delay time allows rapid opening/starting of the vehicle when the driver reaches his automobile quickly or wishes to operate the start button quickly after getting in.

What are known as challenge/response methods allow the identity of a receiver apparatus to be established simply but securely, which is also called authentication.

The challenge datum and the response datum can or should be transmitted in encrypted form, e.g. using a symmetrical method, such as AES (advanced encryption standard) or DES (data encryption standard), or an asymmetrical method, such as RSA (Rivest, Shamir and Adleman) or Diffie Hellmann (DH/DSS—digital signing standard). Hybrid methods having the encryption methods can also be used.

The response datum can be ascertained from the challenge datum using a prescribed computation method. This computation method may be a generally known method or a method that is known only to the transmitter and the receiver. By way of example, a parameter that is required for performing the method or a required datum may be known only to the transmitter and the receiver, however. There may also be a plurality of parameters or data involved that need to be used according to a prescribed scheme, particularly according to a selection scheme.

The first message can be transmitted in the long wave range (LF—low frequency), e.g. in the range from 120 kHz (kilohertz) to 135 kHz.

The message for transmitting the response datum, e.g. a third message or a third signal, can be transmitted in the UHF (ultra high frequency) range, e.g. in the range from 200 MHz (Megahertz) to 500 MHz, particularly when a remote control function is simultaneously used for opening and closing the vehicle.

In one embodiment, the first signal or the first message (check, wake up) does not, by contrast, contain a challenge datum from which a response datum is meant to be computed. By way of example, the first signal or the first message is meant only to establish whether an electronic "key" or an apparatus having the function of an electronic key is close by. The electronic key can then respond to the first message/signal with a third message/signal, the third message not containing a response datum as part of a challenge/response method. Only if the key responds are longer messages produced, e.g. messages that also contain a challenge datum.

In both cases, the signal or the message with the challenge datum can contain an identification datum for the vehicle.

The second signal may be a sound signal and/or a vibration signal and/or a light signal. By way of example, the sound signal has a frequency in the range from 200 Hz (hertz) to 20 kHz (kilohertz). The vibration signal can have a frequency of less than 200 Hz. Alternatively or additionally, a visually perceptible signal can also be used, e.g. a signal produced using an LED (light emitting device).

In one embodiment, however, the electronic key may itself be accommodated in a device that has further functions, i.e. in a mobile radio telephone (cellphone, smartphone) or in a watch, for example, which may be equipped with further functions.

The second signal or the second message can be sent to a telephone or to a watch. The involvement of further devices can ensure that the authorized person cannot fail to see or fail to hear the second signal or the second message, or cannot fail to perceive it for other reasons. The additional devices can have a larger energy store than an electronic key and/or more powerful functions, in order to gain the attention of the person and/or to check plausibility. By way of example, the second signal/message can be transmitted by Bluetooth or another suitable method.

A plausibility check can be performed that involves checking whether the same conditions or conditions in the same range are met for a vehicle and an apparatus for opening and/or starting the vehicle. The conditions may be linked to physical parameters, e.g. data for describing the location, the temperature, the air pressure or other ambient conditions. The location can be described using GPS (Global Positioning System), GLONASS or other satellite-assisted systems. Additionally or alternatively, determination of the location can, by way of example, also involve available WLANs (Wireless Area Network), for example a list of these WLANs or an evaluation of the position of the transmission antennas of the WLANs or of other radio networks.

The plausibility check can be performed before an instant at which the second signal or the second message is produced. Either the second signal or the second message can be produced on the basis of the result of the plausibility check if the plausibility check was negative. If the plausibility check was positive, the second signal cannot be produced.

Hence, no attempt is made to gain the attention of a person if opening or starting is plausible. This results in easing of the burden on the person. It is also possible to avoid "deadening" the attention of the person in this way.

In one embodiment, the second signal or the second message is produced first. Only then is the plausibility check performed. The result of the plausibility check can then be used regardless of the response signal, for example, to terminate the process.

In a simple method, a plausibility check is not performed.

A first surroundings datum can be ascertained in or on the vehicle, particularly at a distance of less than ten meters or less than three meters. The apparatus can perform the method by ascertaining a second surroundings datum preferably in its own surroundings. The two surroundings data can, or, in the absence of a surroundings datum, this fact and the other surroundings datum can, be used for the plausibility check. By way of example, a distance can be ascertained from two location data.

By way of example, the first surroundings datum can be ascertained by an apparatus that is permanently connected to the vehicle. Subsequently, the first surroundings datum can then be transmitted to the apparatus for performing the method, i.e. to an electronic key, for example. Alternatively, the first surroundings datum can be ascertained by the apparatus for performing the method, i.e. by an electronic key when locking the vehicle, for example, i.e. close by the vehicle.

Since, by way of example, a GPS signal is often not available inside buildings, the fact that a location signal is not available can be used for a plausibility check. If, by way of example, one surroundings datum, e.g. location datum, can be ascertained and the other cannot, then this can actually be assessed as meaning that the data are not plausible. By way of example, the vehicle could be in an underground parking garage and the person or the driver could be in the open air. Conversely, the vehicle could be in the open air and the person could be in a building. Both cases are possible only in the case of misuse or a malfunction, for example, which means that opening or starting of the vehicle should be prevented automatically or by involving an automatically notified person.

The first surroundings datum may be a location datum or a temperature datum or an air pressure datum. So that a useful comparison is possible, the second surroundings datum may also be of the same type, i.e. location datum, temperature datum or an air pressure datum. Other surroundings data can also be used for the plausibility check.

The location datum or the location data can be ascertained using a satellite system and/or using a mobile radio network and/or using at least one WLAN. By way of example, such methods are known by the name GPS (global positioning system) or "assisted" GPS.

The plausibility check can be performed after the second signal or the second message is produced. Hence, the driver receives the second signal in any case. The time for the plausibility check can then actually be included with the time remaining for the driver to react.

The plausibility check can also be performed when the termination signal or the termination message is absent. Hence, additional security is provided for the case in which the driver does not hear the signal or does not react or reacts too late. Opening or starting of the vehicle can be not performed when the surroundings data are not established as plausible on the vehicle or on the electronic key.

In one embodiment, the method is used for protection against theft using what are known as relay attacks. To date, protection against such attacks has been able to be achieved only in relatively complex fashion, for example by recording signal propagation times (signal bouncing) or message transmission times or otherwise.

In a further embodiment, the method is combined with a method for recording signal propagation times in order to increase protection. The recording of signal propagation times can be performed particularly as part of the plausibility check. Preferably, the signal propagation time can be determined using the period between a sent signal/message and a subsequently received signal/message (round trip), where particularly the aforementioned delay should not lead to an extension of the recorded time.

The method for opening and/or starting can be performed without recording signal propagation times (signal bouncing) or message transmission times. In a simple and nevertheless comparatively secure manner, it is thus possible to ensure a high level of protection against misuse on account of the notification of the driver, which cannot readily be suppressed for the purposes of a relay method.

A method for performing a contactless automatic entry process or a contactless payment process, particularly using one of the methods explained above, can take either the occurrence or the absence of a termination signal or a termination message on a mobile apparatus as a basis for performing the process when a termination signal or a termination message is not produced within a prescribed time after the production of a signal or a message for a person involved in the process. The process is not carried out if the person produces the termination signal or the termination message within a prescribed time.

Many of the considerations and technical effects for the opening and/or starting of vehicles also apply to payment processes. In that case too, relay attacks are possible. Notification of the owner of an electronic payment apparatus, e.g. an electronic wallet (e-wallet), particularly a mobile telephone equipped with NFC (near field communication), can prevent such misuse if the owner is notified of a transfer and, if need be, can prevent a response from his device by an input action, e.g. a voice input such as "no" or the push of a button or a gesture. Even if the input action comes too late, his attention has still been drawn, which may still allow him to intervene, for example to visit a nearby checkout region or automated teller machine and immediately notify the cashier or other responsible persons.

In one embodiment, the method for performing the payment process is also performed without the check for a termination signal or for a termination message, as has been explained above for the method for opening and/or starting a vehicle.

In developments of the payment method, the features or operations that are explained above for the vehicle are used, with the same or similar technical effects applying.

An apparatus for performing automatic opening and/or enabling of the starting facility of a vehicle can contain:
- a reception unit for receiving a first signal or a first message that is used to perform automatic opening and/or enabling of a vehicle, and
- a transmission unit that takes the reception of the first signal or the first message as a basis for sending a second signal or a second message to the driver of the vehicle.

In one embodiment, the apparatus additionally contains:
- a checking unit that checks whether, within a prescribed time, a termination signal or a termination message is received that indicates that the opening and/or the enabling is meant to be terminated, or whether no such termination signal or no such termination message has been received within the prescribed time, and/or
- a control unit that either performs the opening and/or the enabling when the termination signal or the termination message has not been received or that does not perform the opening and/or the enabling when the termination signal or the termination message has been received.

The control unit can contain a processor, e.g. a microprocessor or a microcontroller, that executes commands stored in an electronic memory. Alternatively, an electronic circuit without a processor can be used. The apparatus can contain further units for performing the methods indicated above, so that the technical effects cited above also apply to the apparatus.

Put in other words, a keyless entry system that recognizes relay attacks is explained. Automobile manufacturers provide automatic driver authorization systems for their vehicles in the top range, in the upper mid-range and more and more often also for the lower ranges. These are also known by the name "keyless go". This is a functionality that allows customers, as an evolutionary step in radio remote control for vehicle unlocking, to unlock and start a vehicle without active operations by carrying a device that acts as a vehicle key. A relay attack, in which the radio link between the key and the vehicle is artificially extended, allows attackers to open and start a vehicle without the knowledge of the driver. This does not require any physical action on the driver or on the vehicle, for example including stealing the key or manipulating the lock.

In a keyless entry system, the vehicle is unlocked automatically as soon as the vehicle key is close by the vehicle and possibly the driver closes his hand around the handle. Subsequently, when he has got in and the key is with him in the vehicle, he can start the car using a start button and begin his journey. The check on authorization is performed using the vehicle key, which uses radio to apply cryptographical methods with the vehicle that are able to be performed successfully only by particular keys that are permanently paired with the vehicle. The actions performed by the user, namely closing the hand around the handle and pushing the start button, serve only to stipulate the moment of unlocking or starting of the vehicle and do not provide additional security.

An essential aspect for the security of the driver authorization check is that the cryptographical method takes place between authentic partners, i.e. between the key and the vehicle.

The additional presence—which is ensured by technical measures—of the key in the interior for starting the vehicle is established only by the product safety.

So as now to understand the vulnerability of the system to relay attacks, the security mechanism is explained here in simplified form. In this case, it is assumed that a distinction does not need to be drawn between a key in the interior and the exterior, since, as mentioned above, this is not an essential necessity for security.

The basic principle is that the vehicle is unlocked whenever the key is close by the vehicle and the handle is grasped. It is critical whether and when unlocking takes place. So that the vehicle can decide whether a key is close by, communication needs to take place between the vehicle and the key. For this, both devices are constantly on standby and can use radio beacons and synchronization messages to detect the mutual presence and to start the authentication with a cryptographic challenge/response message. In this case, the key is authenticated to the vehicle. This involves the use of either a symmetrical or an asymmetrical cryptography method in which ultimately the key proves to the automobile that it is in possession of a secret that only the genuine key can have and also that cannot be obtained in other ways.

The security is based on the cryptographical method being secure and the key and hence the driver being close by the vehicle and thus deterring a possible attacker of the vehicle by virtue of his physical presence. This means that the distance at which the authentication method takes place is not too great, so that the driver prevents an unauthorized person who is possibly present from getting in.

For this challenge/response method, it is possible to use any cryptographical methods deemed secure with any key lengths without this possibly having repercussions for the successful application of a relay attack.

For the relay attack, it is now falsely suggested to the vehicle and the key that they are in the absolute physical presence of one another. This certainty arises for both only by virtue of their being in radio range of one another and this being possible only with actual physical proximity owing to the physical parameters of radio transmission. Under normal conditions, the radio range is accordingly limited just to a few meters. Actual perception of the real distance is not possible for such systems, since it is not possible to use a method that makes it possible to assess the physical distance on the basis of delay or field strength. The first cannot be measured, or can be measured only with very great difficulty, on account of a transmission being at the speed of light, and the latter is infeasible because it is dependent on too many physical factors.

The relay attack is started when the driver together with the key is at a certain minimum distance from the vehicle and therefore can no longer see the vehicle. In this regard, the transmission by the vehicle that is used for presence recognition, for example, is subjected to appropriate radio conditioning by relays (forwarding stations, e.g. antennas), so that it gets to the location at which the key is actually situated and can be received by the key. The transmitted data from the key are transmitted to the location of the vehicle, possibly in the same way. Thus, two relays are possibly used that effectively produce a tunnel in this way. By way of example, two cooperating attackers could plant one relay close to the key and one close to the vehicle. The transmission by the automobile would be forwarded from the relay close to the automobile to the second relay close to the key, which in turn forwards it to the key. The communication in the opposite direction is forwarded possibly in similar fashion or accordingly. The content is not modified, and similarly no attacks on the cryptographical security take place. Since this channel is transparent for the key and the vehicle, this attack is successful.

Erica Naone, "Autoklau per Antenne", Technology Review, Jan. 10, 2011, has shown the vulnerability of almost all driver authorization systems that are currently on the market. Aurélien Francillon, Boris Danev, Srdjan Capkun, "Relay Attacks on Passive Keyless Entry and Start Systems in Modern Cars", NDDS (network and distributed system security symposium) 2011, presents the attack in a scientifically rehashed form. The attack is reproducible with generally available knowledge of the method, with common electrical or communications knowhow and with little complexity in terms of hardware.

There have been only a few feasible solutions for this problem to date. Admittedly, it would be possible to dispense with the use of a keyless entry system. This would require active operations to be taken by a driver that would be more complex to compromise. Alternatively, it would also be possible to interrupt the radio link between the vehicle and the key, for example by transporting the key in a container that is shielded from radio. However, this would have the disadvantage that the gain in functionality through the avoidance of active operations would be destroyed. There is now a great demand for such systems, since they are firstly the logical evolutionary step in traditional radio remote control and can therefore easily be marketed by automotive firms. If nothing else, this functionality is very well accepted by the market. This is certainly also very greatly due to the precise procedure and the risk of the method now being known to the rank and file of users.

The mechanism on which this invention is based cannot affect the basic application of a relay attack. However, this document presents a method that draws the attention of a driver to a relay attack in progress and thus allows him to interrupt it. In this regard, the unlocking mechanism is extended by additional operations.

1. The vehicle sends a challenge or another message to the key.

2. The key receives the challenge or the other message and delays processing initially by a fixed but arbitrary period of time. In the interim, for example, the driver is informed about authentication in progress, for example by audible, visual and/or vibratory signals. He then has the opportunity to actively terminate the procedure of authentication within a defined period of time by operating a button on the key should this be unexpected, for example because he is not close by his vehicle or does not wish to unlock his vehicle.

3. a) The driver has pushed the button: the process terminates.

3. b) The driver does not push the button: the key transmits the computed response to the vehicle and the vehicle is ready for unlocking.

Against the background of this invention, a keyless entry system would still work because the driver, who actually wishes to open his automobile in an authorized manner, could ignore the report by the key and the automobile would thus continue to unlock automatically without active operations. The method according to one aspect of the invention would possibly just require a longer period of time for the process. In this period, the key and the automobile need to be in range of one another. This range should be sufficiently great for a delay to be avoided for the driver, for example because he reaches the automobile before the authentication process is complete. Accordingly, a possibly greater range should be implemented on the basis of the typical walking speed of a human being.

By way of example, modification of the procedure can also require a control button or another input on the key device.

By way of example, the system would achieve no additional security if the driver does not perceive the signal through his key. By way of example, he could be in noisy surroundings or not keep the key in immediate proximity to him. Perceptibility by the driver could be improved if the key were carried possibly directly on the body or if additional devices, for example a vibrating wristwatch, were likewise activated.

By way of example, an enhanced key could recognize the ambient conditions and thus identify the plausibility of door opening being initiated. It is also conceivable for the key to be connected to the smartphone (for example iPhone, e.g. Version 4S or later) of the driver, for example by Bluetooth Low Energy or a similar technology. This has more computation power, energy stores and sensors, which means that the plausibility could be identified more reliably.

Regardless of whether the key or the smartphone now recognizes plausibility, the following additional plausibility checks would be possible:

Identification by position:

The location at which the vehicle is parked is known, and the position of the driver could be ascertained by GPS, for example, and compared with the position of the vehicle. If there is a discrepancy, the process would be terminated and the user notified.

Position finding by smartphones is very powerful and also very fast today. This only works in the open air, however. Therefore, should there be no GPS available over a relatively long period, which typically does not occur in the open air, this could be an indication of the key being in a closed building and hence of vehicle unlocking not being plausible, for example if GPS coordinates are available for the vehicle. In this case, the driver is alerted and asked to decide whether or not door unlocking is actually intended. It should be noted that, although "assisted" GPS can be used for detecting positions through the presence of WLAN beacons (periodic synchronization signals), these could likewise be tunneled.

Although plausibility by virtue of further radio signals could provide additional security, these could likewise be tunneled by an attacker. However, this requires relatively great technical complexity, since, by way of example, the need for the presence of a radio-frequency signal for the plausibility check means that a greater bandwidth needs to be covered.

A plausibility check could be supported by further sensors. Temperature or air pressure, for example, could allow a statement about residence in spaces.

One operation in an existing method may be extended by additional operations, so that the security of keyless entry systems is increased without affecting convenience (opening without active operations) or fundamentally challenging the system. Furthermore, the concept of extending the mechanism to an automatic plausibility check on vehicle opening has been described.

The properties, features and advantages of this invention that are described above and also the way in which they are achieved will become clearer and more distinctively comprehensible in connection with the description of the exemplary embodiments that follows. Where the term "can" is used in this application, this involves both the technical possibility and the actual technical implementation. Where the term "approximately" is used in this application, this means that the exact value is also disclosed. The figures are not shown to scale, the aspect ratios of the elements being able to be chosen differently in particular.

BRIEF DESCRIPTION OF THE DRAWINGS

These and other aspects and advantages will become more apparent and more readily appreciated from the following description of the exemplary embodiments, taken in conjunction with the accompanying drawings of which:

FIG. 1 is a schematic diagram showing messages that are transmitted between a vehicle and an electronic key in accordance with a first exemplary embodiment;

FIG. 2 is a schematic diagram showing messages that are transmitted between a vehicle and an electronic key in accordance with a second exemplary embodiment;

FIG. 3 shows operations in accordance with an embodiment;

FIG. 5 shows operations for checking the plausibility of location data; and

FIG. 6 is a plan view showing units in an electronic key.

DETAILED DESCRIPTION OF THE PREFERRED EMBODIMENTS

Figure 4:
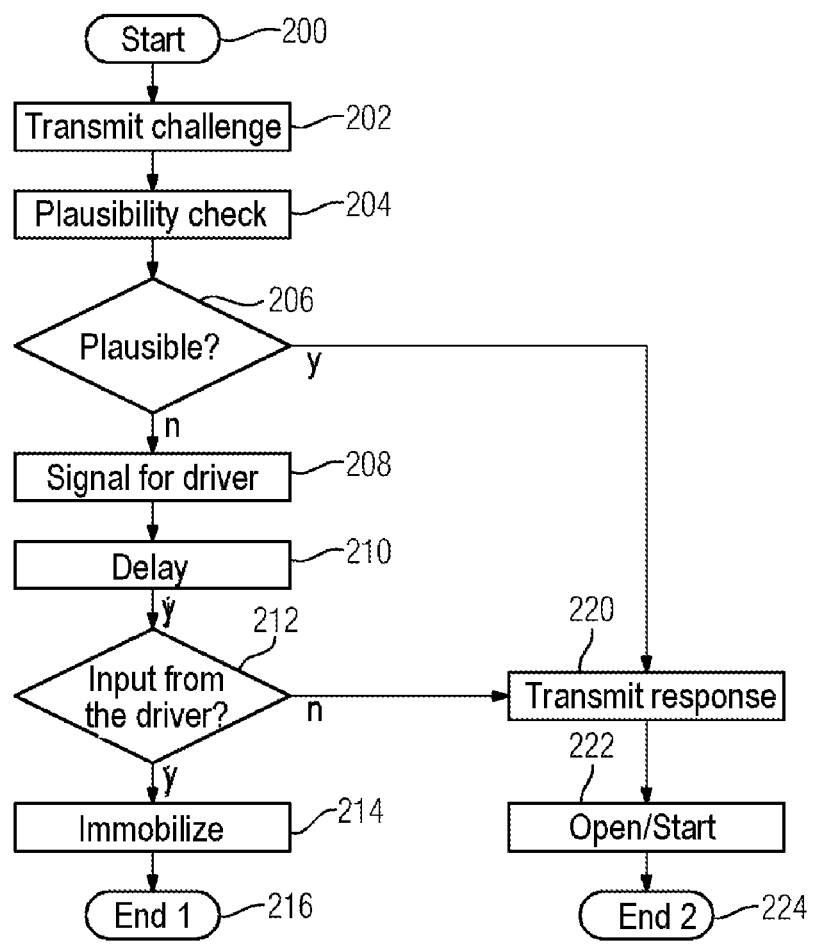
FIG. 4 shows operations in accordance with an embodiment.

Reference will now be made in detail to the preferred embodiments, examples of which are illustrated in the accompanying drawings, wherein like reference numerals refer to like elements throughout.

FIG. 1 shows messages 10 that are transmitted between a vehicle 12 and an electronic key 14 in accordance with a first exemplary embodiment, which operates very efficiently in terms of energy. By way of example, the vehicle 12 is an automobile (car), a motorcycle or a truck. Instead of a vehicle, a boat or aircraft can also be used. Alternatively, different entry control or a payment process can also be implemented in the same way.

The electronic key 14 is explained in more detail below with reference to FIG. 6 and contains an electronic circuit having a processor or without a processor, for example.

The vehicle 12 periodically sends wake up messages 20 that contain short signal trains in order to take the key 14 from a quiescent mode to an active mode, see instant t2, for example. It is assumed that the key 14 is within a radius R1 around the vehicle 12 in which it can receive the message 20, for example in a radius R1 of less than ten meters. The message 20 can be sent in the LF (low frequency) frequency range, for example.

In the active mode, the key 14 acknowledges the message 20 with an acknowledgement message 22 (Ack for short), see instant t4, which is after the instant t2.

Furthermore, at an instant t6, the key 14 produces a signal 28 for the driver of the vehicle 12, which is explained in more detail below with reference to FIGS. 3 and 4, e.g. a sound signal. The signal 28 can draw the attention of the driver to misuse of his key, which is explained in more detail below. Instead of the signal 28, a signal or a message for a device of the driver can also be produced, for example for a mobile radio or for a watch.

Optionally, it is possible to check whether the driver produces a termination signal 29, for example see t8. The driver can use the signal 29 to prevent misuse, as is likewise explained in more detail below. By way of example, misuse can be prevented by virtue of the message 22 or a message 26, which is explained later on, not being produced when the signal 29 occurs. The message 22 can be sent in the UHF (ultra high frequency) frequency range, for example. The signal 29 can come directly from the driver or from a device of the driver to which the signal or the message 28 has also been sent.

At an instant t10, the vehicle 12 sends a message 24, which is longer in comparison with the message 20 and which contains an identification datum ID for the vehicle 12 and what is known as a challenge datum, for example. The message 24 can be sent in the LF (low frequency) frequency range, for example.

The key 14 receives the message 24 and then, at an instant t12, produces a response message 26 that contains a response datum that has been computed using the previously received challenge datum, for example. This allows the key 14 to prove its identity. Before sending the message 26, the key 14 also checks the ID of the vehicle, for example, so that it responds only to messages 24 from "its" associated vehicle. The message 26 can be sent in the UHF (ultra high frequency) frequency range, for example.

The vehicle 12 receives the message 26, checks the correctness of the response datum and, if appropriate, opens the door, e.g. if a person, preferably the driver, also touches the door, or enables a motor start button, for example if the key 14 or a signal forwarded thereby is already in the interior of the vehicle 12.

The messages 20 to 26 can be transmitted in encrypted form, for example using an electronic encryption method as cited in the introduction.

If unauthorized access operations for the key 14 are performed, the radius R1 may also be a multiple of the aforementioned value. It is thus possible for the messages 20, 24 coming from the vehicle 10 to be forwarded via a cable, for example. Alternatively or additionally the messages 20, 24 can also be received with an antenna and forwarded with or without amplification to a key 14 that is further away. Hence, positions P1 (vehicle), P2 (key) may be more than 30 meters or even more than 50 meters apart, for example, even though the signals from the vehicle 12 actually have only the aforementioned comparatively short range of less than 10 meters, for example.

For the return channel, i.e. messages 22 and 26, unauthorized forwarding can likewise take place. However, the UHF signals can have a greater range than the LF signals, which means that additional forwarding of the UHF signals may not be necessary in the event of misuse of the key 14 by unauthorized persons.

The signals 28 and the optional signal 29 may also be situated between the instants t10 and t12. Alternatively, the signal 28 is situated between the instants t4 and t10 and the optional signal 29 is situated between the instants t10 and t12, for example. The radius R1 can apply to opening and be different than a radius for starting.

FIG. 2 shows messages 10b that are transmitted between a vehicle 12b and an electronic key 14b in accordance with a second exemplary embodiment, in which the automobile periodically sends relatively long messages that already contain a challenge datum.

The statements made above likewise apply:
to a vehicle 12b that corresponds to the vehicle 12, and
to a key 14b that corresponds to the key 14.

The vehicle 12b periodically sends messages 30 that contain an identification datum ID for the vehicle 12b and what is known as a challenge datum, for example, see instant t20, for example. By way of example, the message 30 can be sent in the LF (low frequency) frequency range.

The key 14b receives the message 30 and, at an instant t22, produces a signal 40 that corresponds to the signal 28. The signal 40 can also draw the attention of the driver to misuse of his key, which is explained in more detail below. Instead of the signal 40, a signal or a message for a device of the driver can also be produced, for example for a mobile radio or for a watch.

Optionally, it is possible to check whether the driver produces a response signal 41 that corresponds to the signal 29, for example see instant t24. The driver can use the signal 41 to prevent misuse, as is likewise explained in more detail below. By way of example, the misuse can be prevented by virtue of a message 32, which is explained later on, not being produced when the signal 41 occurs. The signal 41 can come directly from the driver or from a device of the driver to which the signal or the message 40 has already been sent.

At an instant t26, the key produces a response message 32, for example, that contains a response datum that has been computed using the previously received challenge datum, for example. This allows the key 14b to prove its identity. Before sending the message 32, the key 14b can also check the ID of the vehicle, so that it responds only to messages 24 from "its" associated vehicle 12b. By way of example, the message 32 can be sent in the UHF (ultra high frequency) frequency range.

The vehicle 12b receives the message 32, checks the correctness of the response datum and, if appropriate, opens the door, e.g. if a person, preferably the driver, also touches the door, or enables a motor start button, for example if the key 14b or a signal coming therefrom and forwarded by way of misuse is already in the interior of the vehicle 12.

The messages 30 and 32 can be transmitted in an encrypted form, for example using an electronic encryption method as cited in the introduction.

With regard to misuse of the key 14b, the statements made in relation to misuse of the key 14 with reference to FIG. 1 apply. In FIG. 2, the positions P1b and P2b correspond to the positions P1 and P2. A radius R1b corresponds to the radius R1. The radius R1b can apply to opening and be different than a radius for starting.

FIG. 3 shows operations in accordance with a first method. The method begins in a operation 100. The operations are also referred to as operations below for short. In a operation 102 that is carried out after operation 100, the message 20 or the challenge message 24 or 30 is transmitted from the vehicle 12, 12b to the key 14, 14b.

After receiving the message 20, 24 or 30, the key 14, 14b produces the signal 28 or 40 for the driver, see operation 104. Next, in a delay operation 106, the driver is given time to react to the signal 28 or 40, for example in order to prevent misuse of the key 14, 14b.

Operation 106 can be followed immediately by a operation 110, in which a check is performed to determine whether the driver has produced the signal 29 or 41 in order to terminate opening or starting. If this is the case, operation 110 is immediately followed by a operation 112 being carried out that leads to the key 14 or 14b being blocked. Alternatively, the sending of response messages is prevented on the basis of one response message, on a plurality of response messages or on the basis of a further period of time, for example. The method has then reached a first end, see operation 114.

If, by contrast, operation 110 establishes that the driver has not produced a signal 29, 41 within a stipulated period of time, then operation 110 can immediately be followed by a operation 118 in which the message 26 or 32 is transmitted.

Operation 118 can be followed by a operation 120, with the vehicle 12 or 12b opening the door or enabling a motor start button. The method is then finished at a second end, see operation 122.

The method explained with reference to FIG. 3 can also be used in other exemplary embodiments, as explained above with reference to FIGS. 1 and 2.

Between operations 106 and 110 or between operations 110 and 118, it is possible to perform a plausibility check, which is explained in more detail below with reference to FIG. 5, for example, or wherein additionally or alternatively other check variables are used, for example the variables ambient temperature and/or ambient pressure that are cited in the introduction.

For the plausibility check 108, it can hold that the existence of plausibility immediately prompts operation 110, i.e. the driver still has the option of producing the signals 29 and 41 in order to prevent opening/starting. If, by contrast, the plausibility check 108 establishes that there is no plausibility, then operation 112 can follow directly. Hence, the key 14, 14b is blocked without there being a reaction from the driver, i.e. the signal 29 or 41.

For the plausibility check 116, it can hold that the existence of plausibility immediately prompts operation 118, i.e. the next message to the vehicle 12 or 12b is transmitted. If, by contrast, the plausibility check 116 establishes that there is no plausibility, then operation 112 can follow directly. Hence, the key 14, 14b is blocked even when the driver has not reacted, i.e. the signal 29 or 41 has not been sent.

Alternatively, the plausibility check could be begun even before operation 106 or before operation 104. If the plausibility check is ended even before these operations 106 and 104, then a method is obtained that corresponds to the method explained below with reference to FIG. 4.

FIG. 4 shows operations in accordance with a second method, in which the signal 28, 40 or another signal for the driver is produced only when an implausible circumstance is established that indicates misuse. The method begins in a operation 200. The operations are also referred to as operations below for short. In a operation 202 that is carried out after operation 200, the message 20 or the challenge message 24 or 30 is transmitted from the vehicle 12, 12b to the key 14, 14b.

After receiving the message 20, 24 or 30, the key performs a plausibility check, which is explained in more detail in the introduction or below, for example. By way of example, this involves the positions P1 (vehicle), P2 (key) or P1b (vehicle) and P2b (key) being recorded, see operation 204. If the distance between the positions is too great or there are other discrepancies with respect to the positions, for example one position can be ascertained and the other position cannot be ascertained, then there is no plausibility. If, by contrast, both positions P1, P2 or P1b and P2b match or they are not too far apart, for example, then there is plausibility.

If a checking operation 206 establishes that there is no plausibility, then operation 206 is immediately followed by a operation 208 being carried out, in which a signal for the driver is produced, for example, see signals 28 and 40, for example.

This is followed in a operation 210 by a delay in the range from 1 to 2 seconds, for example, or in the range from 1 to 3 seconds.

This is followed in a operation 212 by a check to determine whether the driver has made an input, i.e. whether the key 14, 14b has received the signal 29 or 41, for example. If this is the case, operation 212 is followed immediately by a operation 214. In operation 214, the key is blocked or opening and/or starting of the vehicle 14, 14b is prevented in another way. The method is then at a first end, see operation 216.

If, by contrast, operation 212 establishes that the driver has not produced a termination signal, e.g. 29, 41, in the prescribed time, then operation 212 can be followed immediately by a operation 220, which corresponds to operation 118, i.e. transmission of a message from the key 14, 14b to the vehicle 12, 12b. Operation 220 is then followed by a operation 222, which corresponds to operation 120, for example opening or starting of the vehicle. The method is then finished in a operation 224.

FIG. 5 shows operations 300 to 310 for checking the plausibility of location data. The check on the plausibility begins after the obtainment of all the relevant data, for example in operation 300, operation 300 for short.

In a operation 302 that follows operation 300, a check is performed to determine whether it has been possible to ascertain GPS coordinates GPS1 or GPS2 for the two positions P1, P2 or P1b, P2b, for example. Specifically, a check is first of all performed to determine whether the GPS coordinates GPS1 are available for the position P1 or P1b and the coordinates GPS2 have not been able to be ascertained for the position P2 or P2b. If this applies, there is no plausibility and the method is finished in a operation 310. If the condition does not apply, on the other hand, then a operation 304 follows operation 302.

In operation 304, a specific check is performed to determine whether the GPS coordinates GPS1 are not available for the position P1 or P1b and the coordinates GPS2 have been able to be ascertained for the position P2 or P2b. If this applies, there is again no plausibility and the method is again finished in operation 310. If the condition does not apply, on the other hand, then a operation 306 follows operation 304.

In operation 306, a check is performed to determine whether the GPS coordinates GPS1 are not available for the position P1 or P1b and whether the coordinates GPS2 have likewise not been able to be ascertained for the position P2 or P2b. If this applies, there is plausibility and the method is finished in a operation 308, in which plausibility is noted. If the condition does not apply, on the other hand, then operation 310 follows operation 306, i.e. no plausibility is established.

Alternatively or additionally, the plausibility check can also involve the ascertainment of a distance between the GPS coordinates GPS1 and GPS2. It is then possible to check whether the computed distance is shorter than a prescribed distance. If this is the case, there is plausibility. If the computed distance is longer than the prescribed distance, on the other hand, then this can be assessed as implausible. By way of example, it is possible to use the same prescribed distances or different prescribed distances for opening and for enabling starting.

The check on the plausibility(ies) that is explained with reference to FIG. 5 can be performed in operation 108 or 116 in FIG. 3, for example, or in operations 204 and 206 in FIG. 4.

The order of operations 100 to 310 is exemplary and can also be altered. It is possible for additional operations to be carried out between the cited operations. It is also not always necessary for all the operations shown in FIGS. 3 to 5 to be carried out.

FIG. 6 shows units in an electronic key 350, which can be used as key 14 or 14b, for example.

The electronic key 350 contains:
a transmission unit S for sending the message 22, 26 or 32,
a reception unit E for receiving the message 20, 24 or 30,
a processor P, in particular a microcontroller,
an electronic memory M that, by way of example, contains a volatile memory portion (e.g. RAM—random access memory) and a nonvolatile memory portion (e.g. ROM—read only memory) for storing program commands and data,
by way of example, optionally, a button or switch 352 or another input apparatus that the driver can use to prevent the opening process or the enabling of the start button,
by way of example, a loudspeaker 354 or another output device that can be used to draw the attention of the driver to an opening process or starting process, and
a checking unit 356 that, by way of example, contains the processor P and that, by way of example, performs the checking operations explained above with reference to FIGS. 1 to 5.

The key 350 can also contain further units for providing a remote control function for opening the vehicle 12, 12b.

The unit 350 could also be an electronic wallet that is based on NFC (near field communication) for payment, for example. The methods explained above with reference to FIGS. 1 to 5 could then also be performed in order to prevent misuse in payment processes.

In other exemplary embodiments, the unit 350 is implemented without a processor P, i.e. without execution of a program for providing the functions of the unit 350. It is thus possible to implement a state machine with an integrated circuit, e.g. with an FPGA (field programmable gate array).

The unit 450 can have a largest dimension (e.g. length) of less than 15 centimeters or less than 5 centimeters or less than 3 centimeters.

The unit 350 may be implemented as part of a mobile radio telephone (cellphone, smartphone), which can apply to the opening or enabling function or else to the payment function. It is also possible for both or all three cited functions to be implemented in a mobile radio telephone/smartphone.

The exemplary embodiments are not true to scale and not restrictive. Modifications as part of the action of a person skilled in the art are possible. Although the invention has been illustrated and described in more detail by the preferred exemplary embodiment, the invention is not restricted by the disclosed examples, and other variations can be derived therefrom by a person skilled in the art without departing from the scope of protection of the invention. The developments and embodiments cited in the introduction can be combined with one another. The exemplary embodiments cited in the description of the figures can likewise be combined with one another. In addition, the developments and embodiments cited in the introduction can be combined with the exemplary embodiments cited in the description of the figures.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for a system to perform an automatic contactless process, the method comprising:
receiving a first signal from outside the system requesting execution of the automatic contactless process;
transmitting a demand signal to an authorized user of the system in response to the first signal;
monitoring for a second signal from the authorized user throughout a duration of a predetermined time beginning with the transmission of the demand signal;

performing the automatic contactless process if no second signal is received in response to the demand signal within the duration of the predetermined time, and terminating the automatic contactless process if the second signal is received within the duration of the predetermined time.

2. A method for performing automatic opening or enabling of a vehicle, the method comprising:

receiving a first signal to perform the opening or the enabling of the vehicle;

transmitting a second signal for a driver of the vehicle based on the reception of the first signal;

monitoring for a termination signal throughout a duration of a predetermined time;

performing the opening or the enabling of the vehicle if no response to the second signal is received within the duration of the predetermined time after transmission of the second signal;

terminating either the opening or the enabling of the vehicle if a termination signal indicating that the opening or the enabling of the vehicle is to be terminated is received within the duration of the predetermined time.

3. The method as claimed in claim 2, wherein the predetermined time is selected from the group consisting of from 1 second to 10 seconds, from 1 to 2 seconds, and from 1 to 3 seconds.

4. The method as claimed in claim 2, wherein the first signal contains a datum for which a receiver of the first signal produces a response datum.

5. The method as claimed in claim 4, wherein the response datum establishes an identity of the receiver of the first signal.

6. The method as claimed in claim 2, wherein the second signal is selected from the group consisting of a sound signal, a vibration signal, and a light signal, and wherein the transmitting sends the second signal a telephone or to a watch.

7. The method as claimed in claim 2, further comprising performing a plausibility check including checking whether at least one condition in a predefined match for the vehicle and an apparatus exists for the opening or the enabling of the vehicle.

8. The method as claimed in claim 7, wherein the performing of the plausibility check occurs before the transmitting of the second signal is performed, wherein the second signal is transmitted if the plausibility check is negative, and wherein the second signal is not transmitted if the plausibility check is positive.

9. The method as claimed in claim 7, wherein the plausibility check is performed after the second signal is transmitted.

10. The method as claimed in claim 7, further comprising:

measuring a first surroundings datum in or on the vehicle, measuring a second surroundings datum in an apparatus for performing the method, and using the first surroundings datum and the second surroundings datum for the plausibility check.

11. The method as claimed in claim 10, wherein the first surroundings datum is measured at a distance of less than three meters from the vehicle, and wherein the first surroundings datum is selected from the group consisting of a location datum, a temperature datum, and an air pressure datum.

12. The method as claimed in claim 11, wherein measuring of the first surroundings data includes measuring the location datum using a system selected from the group consisting of a satellite system, a mobile radio network, and a wireless local area network.

13. The method as claimed in claim 2, wherein the performing of the plausibility check occurs when the termination signal is not received.

14. The method as claimed in claim 2, wherein no recording of signal propagation times and no recording of message transmission times occurs in the opening or the enabling of the vehicle.

15. The method as claimed in claim 2, wherein the first signal is a first message.

16. The method as claimed in claim 15, wherein the second signal is a second message.

17. The method as claimed in claim 2, wherein the termination signal is a termination message.

18. An apparatus for performing automatic opening or enabling of a vehicle, the apparatus comprising:

a receiver receiving a first signal to perform the opening or the enabling of the vehicle;

a transmitter transmitting a second signal for a driver of the vehicle based on the reception of the first signal;

a controller monitoring for a termination signal within a predetermined time after the second signal has been transmitted, the termination signal indicating that the opening or the enabling of the vehicle is meant to be terminated; and the controller performing either the opening or the enabling of the vehicle if no response to the second signal is received within the predetermined time; and the controller preventing the opening or the enabling of the vehicle if the termination signal is received within the predetermined time.

19. The apparatus as claimed in claim 18, wherein the predetermined time is selected from the group consisting of from 1 second to 10 seconds, from 1 to 2 seconds, and from 1 to 3 seconds, and wherein the first signal contains a datum for which a receiver of the first signal produces a response datum.

20. The apparatus as claimed in claim 19, wherein the transmitter transmits the response datum as part of a challenge/response method establishing an identity of the receiver of the first signal.

* * * * *